United States Patent [19]
Mitchell et al.

[11] Patent Number: 6,137,268
[45] Date of Patent: Oct. 24, 2000

[54] SYSTEM WITH LIMITED LONG-TIME-AVERAGED BATTERY CHARGING RATE

[75] Inventors: Nathan Mitchell, The Woodlands; Joseph F. Freiman, Cypress, both of Tex.

[73] Assignee: Compaq Computer Corporation, Houston, Tex.

[21] Appl. No.: 08/885,215

[22] Filed: Jun. 30, 1997

[51] Int. Cl.[7] .................................................. H02J 7/04
[52] U.S. Cl. ............................................ 320/149; 310/155
[58] Field of Search ................................. 320/149, 137, 320/155, 140, 141, 145, 146

[56] References Cited

U.S. PATENT DOCUMENTS

| | | |
|---|---|---|
| 3,944,904 | 3/1976 | Hase . |
| 4,354,148 | 10/1982 | Tada et al. . |
| 5,084,664 | 1/1992 | Gali . |
| 5,289,101 | 2/1994 | Furuta et al. . |
| 5,296,797 | 3/1994 | Bartlett . |
| 5,307,000 | 4/1994 | Podrazhansky et al. . |
| 5,367,244 | 11/1994 | Rose . |
| 5,376,875 | 12/1994 | Yee et al. . |
| 5,408,170 | 4/1995 | Umetsu et al. . |
| 5,412,306 | 5/1995 | Meadows et al. . |
| 5,422,559 | 6/1995 | Hall et al. . |
| 5,440,221 | 8/1995 | Landau et al. . |
| 5,442,274 | 8/1995 | Tamai . |
| 5,481,174 | 1/1996 | Martin et al. . |
| 5,523,671 | 6/1996 | Stewart . |
| 5,541,491 | 7/1996 | Yamazaki et al. . |
| 5,598,085 | 1/1997 | Hasler . |
| 5,614,805 | 3/1997 | Momotani et al. . |
| 5,617,007 | 4/1997 | Keidl et al. . |

OTHER PUBLICATIONS

"Battery–Management Circuitry Gets Smarter", Sr.Editor, Computer Design's OEM Integration, May 1994, pp. 15–18.
N.Marincic et al., "Warm Rechargeable Lithium Polymer Batteries For Downhole Applicat Application", Mar. 1997, 14th Int'l Seminar on Primary & Secondary Batteries.
Benchmarq application, "Using the Bq2003 to Control Fast Charge", Nov. 1994.
Benchmarq, "Using NiMH and Li–Ion Batteries in Portable Applications", Apr. 1995.
Maxim Data Sheet, "MAX1259 Battery Manager", 19–4638, Apr. 1994.
Benchmarq Data Sheet, "Bq2002 Fast Charge IC", Sep. 1996.
Benchmarq Data Sheet, "Bq2005 Dual–Battery Fast Charge IC", Sep. 1996.
Benchmarq Data Sheet, "Bq2014 Gas Gauge IC with External Charge Control", Dec. 1995.
Benchmarq Data Sheet, "Bq2053X Lithium Ion Pack Supervisor", Sep. 1996.
Hooper et al., "Pulse Discharge Characteristics of Solid–State Lithium Batteries" Journal of Power Sources, 27, 3–13, Jan. 1989.

*Primary Examiner*—Peter S. Wong
*Assistant Examiner*—K. Shin
*Attorney, Agent, or Firm*—Robert Groover

[57] ABSTRACT

A battery charging system in which current is averaged over a long time period (seconds) to determine the maximum average charging rate. When the integral of charging current over this long period reaches the programmed maximum charge value for one period, current is simply cut off for the remainder of the fixed long period.

31 Claims, 2 Drawing Sheets

SYSTEM WITH LIMITED LONG-TIME-AVERAGED BATTERY CHARGING RATE

BACKGROUND AND SUMMARY OF THE INVENTION

The present invention relates to circuits and methods for rapidly recharging batteries in portable computers.

Many battery technologies, such as nickel/metal hydride ("NiMH"), achieve their best lifetime and energy storage if they are not recharged at too high a rate. For ordinary NiMH batteries, it is preferable not to recharge them any faster than their "1 C" rate. (This is the rate which will theoretically charge a battery to its capacity in one hour; thus, for a 1.7 Ampere-hour battery the 1 C rate is 1.7 Amperes.) The characteristics of NiMH batteries, and of many other battery types, are described in Linden, HANDBOOK OF BATTERIES (2.ed. 1995), which is hereby incorporated by reference.

Modern portable computers typically include an AC adapter which, when the computer is plugged into a mains power socket, derives DC power from the AC input. This DC power is used to power the electronics, and also to recharge the battery or batteries in the computer. As modern portable computers are loaded with more powerful electronics and more accessories, their AC adapters have become correspondingly more powerful. A surprising side-effect of this is that the AC adapters are sometimes powerful enough to provide too much current to the batteries when the computer is off.

System with Limited Long-Time-Averaged Battery Charging Rate

The present application describes a battery charging system in which the battery charge rate is limited in a very simple way. The present inventors have realized that the maximum charging rate can be averaged over a very long time window. Accordingly, the present application teaches that the battery charging rate can be limited to an appropriate level merely by: measuring the charging current over a fixed long period (10 seconds, in the presently preferred embodiment), and when the maximum charge for one period has been transferred, then cutting off current for the remainder of the fixed long period.

This method permits good control of battery charging to be performed with minimal load on the controller logic. Thus this control algorithm can easily be performed by a microcontroller or microprocessor which has many other supervisory functions.

The present inventors have obtained confirmation that this technique produces an internal pressure profile (within the battery) which is very similar to that of continuous charging at the same average rate. Thus battery degradation is easily avoided.

Of course, the target charging rate does not have to be a 1 C rate. At least one author has suggested that charging rates up to 5 C can be used for NiMH batteries. (This is a very aggressive specification, and would not be used in most systems.) However, whatever the target charging rate, the present application provides a new way to achieve it.

This innovative charging step does not have to be the only charging step, and can optionally be preceded or followed by charging steps which use completely different control algorithms. Many such control algorithms are detailed in the HANDBOOK OF BATTERIES cited above.

BRIEF DESCRIPTION OF THE DRAWING

The disclosed inventions will be described with reference to the accompanying drawings, which show important sample embodiments of the invention and which are incorporated in the specification hereof by reference, wherein.

DETAILED DESCRIPTION OF THE PREFERRED EMBODIMENTS

The numerous innovative teachings of the present application will be described with particular reference to the presently preferred embodiment. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

Figure 1:
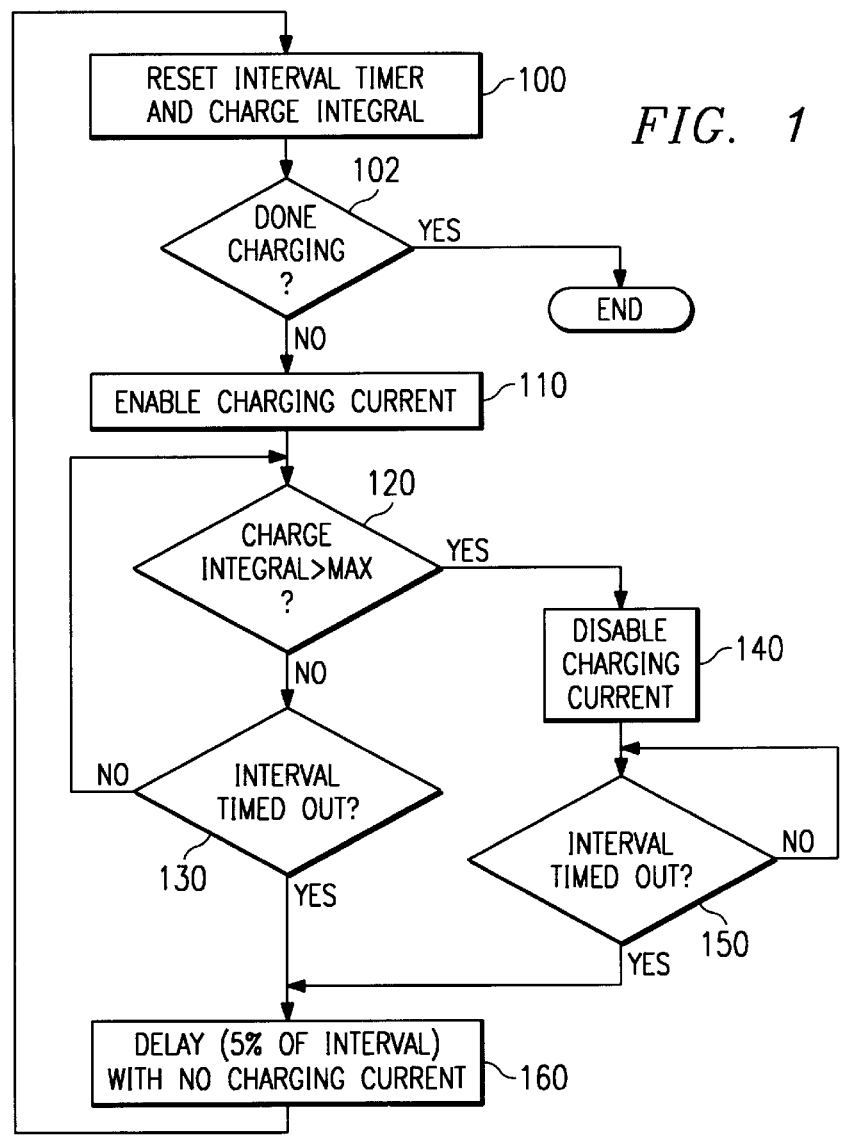
FIG. 1 shows a flowchart of the process of the presently preferred embodiment.

FIG. 1 shows a flowchart of the process of the presently preferred embodiment. As noted above, maximum charge transfer is measured over long intervals (10 seconds in the presently preferred embodiment).

At the beginning of one of the long intervals, the interval timer and charge integral counter are reset (step 100).

If charging has not yet been completed (branch 102), charging current is now enabled (step 110).

Charging is now allowed to continue until the charge integral counter reaches its maximum (branch 120) or the interval times out (branch 130).

When the charge integral counter reaches its maximum (as determined by branch 120), charging current is disabled (step 140), and remains off until the interval times out (branch 150).

In any case, once the interval times out (branch 130 or 150), the charging current is held off for a short period (step 160). In the presently preferred embodiment, this short period is 5% of the long period, or half a second. However, this parameter can of course be varied. This short delay allows the open-circuit voltage of the cell itself to be accurately measured, with enough delay to allow for electrochemical relaxation effects.

Figure 2:
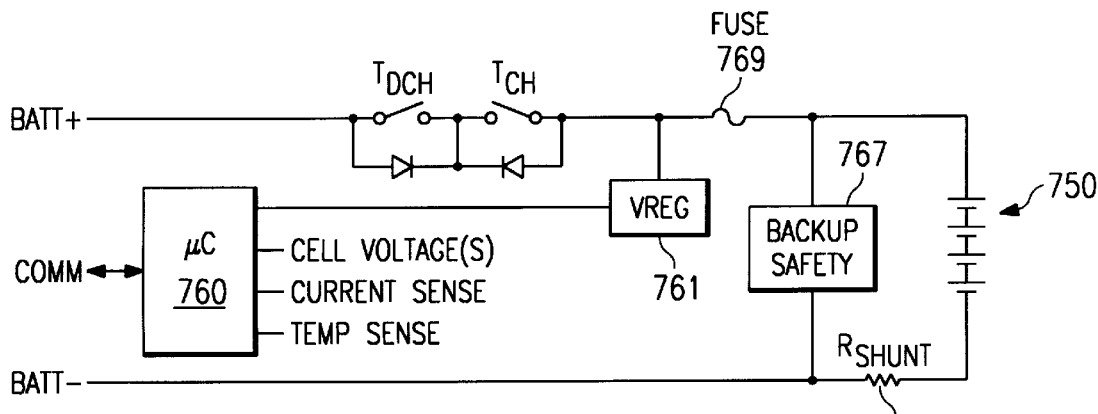
FIG. 2 generally shows the electrical configuration of the smart battery pack which can use the innovative charging system.

FIG. 2 shows a block diagram of a sample implementation of the circuitry integrated with the battery pack of FIG. 1.

A microcontroller 760 receives various sense inputs, including e.g. battery cell voltage, a temperature sensing input, and a current sensing input (derived from the shunt resistor 763 on the negative side of the cells 750). If more sense inputs are needed, a multiplexer is optionally used to conserve the available ports of the microcontroller. (For example, with a lithium-ion battery it is preferable to monitor the voltage of each cell in a series combination.) The shunt resistor is preferably very small, e.g. about 50 milliohms. The microcontroller 760 also provides communication with the host, preferably through a serial bus such as an $I^2C$ bus. Thus the connector 752 (shown in FIG. 5) includes not only the current-carrying terminals BATT+ and BATT−, but also the lines for the serial communication bus. This connector can also include connections which allow the microcontroller 760 to discern which bay (of a multi-bay system) the smart battery pack is in, and whether it is currently the active battery pack. A stable power supply for the microcontroller 760 (and other control circuitry) is provided by a small regulator 761. A charging transistor $T_{CH}$ cuts off charging current when it is turned off, and a discharging transistor $T_{DCH}$ cuts off discharging current when it is turned off. (Note that the built-in diodes of these two transistors are opposed.) A conventional backup safety circuit 767 also monitors total battery voltage, and will blow the fuse 769 if for some reason the microcontroller 760 fails to correct an overcharging situation.

In the preferred implementation the microcontroller uses slope-detecting analog/digital converters, which are necessarily slow. This results in a slow loop time. However, the present application shows that a system with this slow loop time is still adequate to control charging, by using integration over a long time period (seconds, in this example). Faster hardware could perform a similar algorithm, but the present invention provides a way to achieve efficient control very easily, with minimal hardware burden.

It should be noted that the length of the integration time is related to the size of the battery. Thus the presently preferred embodiment uses a surprisingly long integration time (10 seconds) for a SMALL battery (about 35 Watthours).

The integration time is also related to the charging rate. The presently preferred embodiment uses a charging rate of 1 C, but for higher charging rates a shorter integration time can be used.

More precisely, this class of embodiments teaches that, for charging rates in the range of 0.5 C to 2 C, the ratio of the integration time in seconds to the battery size in Watthours should be more than 0.01. (Even more advantageously this ratio can be more than 0.1.) Thus in the most preferred embodiments, with battery sizes of 100 Watt-hours or less, the integration time will be one second or more.

In another class of alternative embodiments, where charging rates higher than 1 C are used, the above minimum integration times can be divided by the charging rate in units of "C". The inventions disclosed in the present application can be particularly advantageous with high-rate charging. Conventional high rate chargers often extract a second or third derivative, to try to identify transitions in the charging curve, but the present application reduces the need for such computations.

Figure 3:
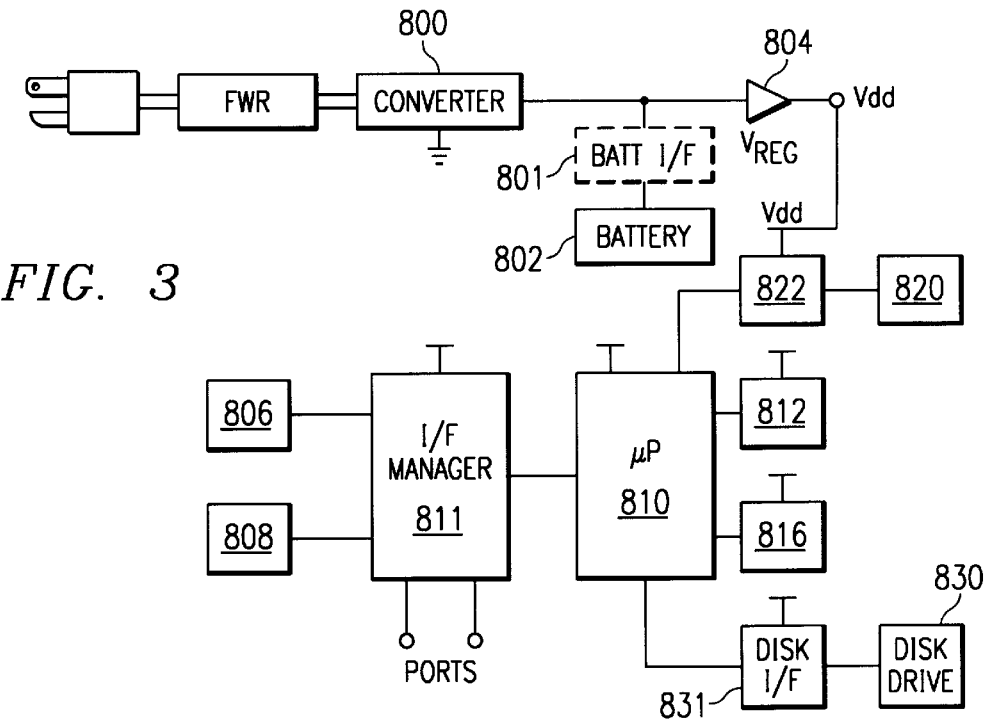
FIG. 3 shows a portable computer system which can use the innovative charging system.

FIG. 3 shows a portable computer which can use the innovative charging method. The system includes a power converter 800 which is used to charge the battery 802. Optionally, a battery interface 801 is interposed between the battery and the rest of the circuitry. The power converter 800 is connected, through a full-wave bridge rectifier, FWR, to draw power from AC mains, and is connected to provide a DC voltage to the battery 802. The battery 802 (or the converter 800), connected through a voltage regulator 804, is able to power the complete portable computer system, which includes in this example:

user input devices (e.g. keyboard 806 and mouse 808);
at least one microprocessor 810 which is operatively connected to receive inputs from said input device, through an interface manager chip 811 (which also provides an interface to the various ports);
a memory (e.g. flash memory 812 and RAM 816), which is accessible by the microprocessor;
a data output device (e.g. display 820 and display driver card 822) which is connected to output data generated by microprocessor; and
a magnetic disk drive 830 which is read-write accessible, through an interface unit 831, by the microprocessor.

Optionally, of course, many other components can be included, and this configuration is not definitive by any means.

Figure 4:
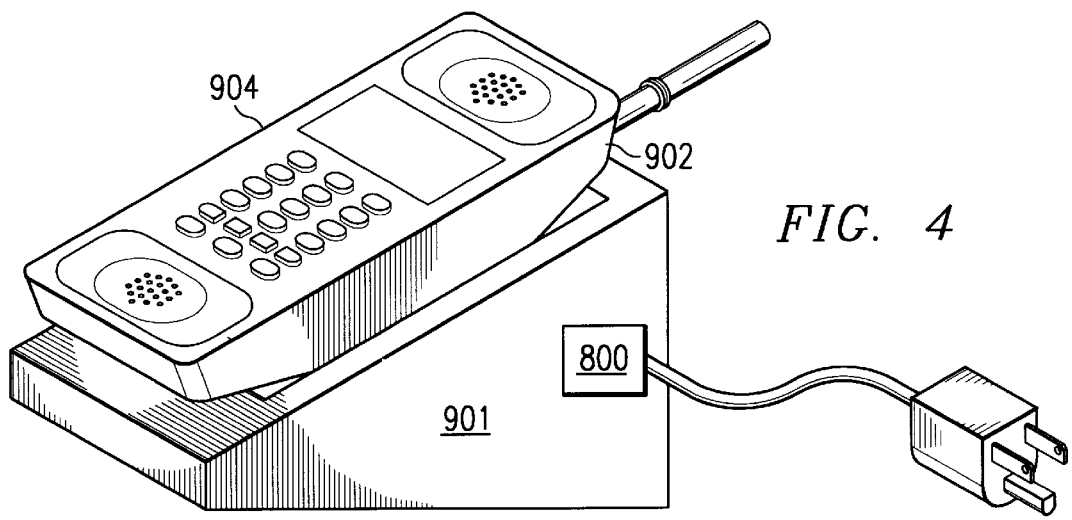
FIG. 4 shows a stand-alone battery charger which can use the innovative charging system.

FIG. 4 shows a stand-alone battery charger 901, including a power converter 800, which can use the innovative charging method to charge the detachable battery module 902 of a mobile telephone 904 which is placed in the rack of the charger 901. In this system embodiment, the battery module 902 can be constructed according to the embodiments described above. In alternative embodiments, the innovative power architecture can be integrated with other portable electronics.

Figure 5:
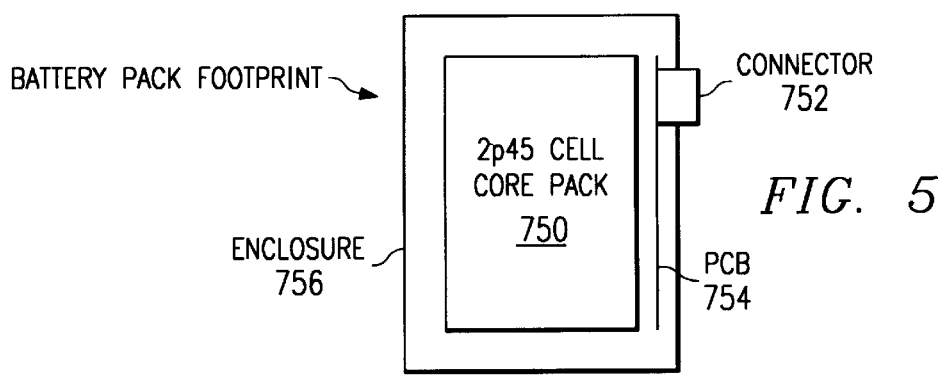
FIG. 5 shows the physical configuration of the smart battery pack shown in FIG. 2.

FIG. 5 shows the physical configuration of a smart battery pack which can use the innovative charging method. A group of battery cells 750 is connected to a printed circuit board ("PCB") 754, which is connected to an external connector 752. The group of battery cells 750, in this sample embodiment, is made of a welded-together group of cylindrical cells (18 mm diameter and 65 mm high) connected in a 2P4S configuration (i.e. with four pairs of cells connected in series), but of course a prismatic cell or other cell configurations can be used instead. The board 754 and the cells 750 are protected by enclosure 756, which can be a rigid plastic case or a skin of tough plastic.

According to a disclosed class of innovative embodiments, there is provided: A method of charging a battery pack which includes a built-in cutoff transistor, comprising the steps of: (a.) monitoring charge transferred into the battery pack during successive fixed durations; and (b.) whenever the charge transferred into the battery pack during any one of said fixed durations exceeds a fixed maximum value, then cutting off current to the battery for the remainder of said one of said fixed durations; and (c.) at the beginning of the next one of said fixed durations, applying current to said battery if further charging is needed, and repeating said steps (a.) and (b.).

According to another disclosed class of innovative embodiments, there is provided: A method of charging a battery pack of 100 Watt-hours or less, comprising the steps of: (a.) connecting the battery pack to the available current from a power supply, while intermittently turning off a cutoff transistor as necessary to limit the average current into the battery pack; wherein said step of turning off said cutoff transistor is performed no more than once per second.

According to another disclosed class of innovative embodiments, there is provided: A method of charging a battery pack of 100 Watt-hours or less at a rate of 0.5 C or greater, comprising the steps of: (a.) connecting the battery pack to the available current from a power supply, while intermittently turning off a cutoff transistor as necessary to limit the average current into the battery pack; wherein said step of turning off said cutoff transistor is performed with a frequency which is greater than said charging rate.

According to another disclosed class of innovative embodiments, there is provided: A computer system comprising a battery charger, said battery charger system being configured to monitor charge transferred into a battery pack during successive first fixed durations and to cut off current to said battery pack for the remainder of one of said first fixed durations whenever the charge transferred into said battery pack during said one of said first fixed durations exceeds a fixed maximum value.

According to another disclosed class of innovative embodiments, there is provided: A computer system, comprising: monitor circuitry to monitor charge transferred into a battery pack during successive fixed durations of time; a cutoff transistor, connected to said monitor circuitry, and connected to cut off current to said battery pack for the remainder of one of said first fixed durations whenever the charge transferred into said battery pack during said one of said first fixed durations exceeds a fixed maximum value.

According to another disclosed class of innovative embodiments, there is provided: A battery charging system, comprising: a line which connects a battery pack to the available current from a power supply; a cutoff transistor, connected to said line between said battery pack and said power supply and configured to limit the average current into the battery pack; wherein said cutoff transistor is turned off no more than once per second.

MODIFICATIONS AND VARIATIONS

As will be recognized by those skilled in the art, the innovative concepts described in the present application can be modified and varied over a tremendous range of applications, and accordingly the scope of patented subject matter is not limited by any of the specific exemplary teachings given.

What is claimed is:

1. A method of charging a portable battery pack which includes a built-in cutoff transistor, comprising the steps of:
   (a.) monitoring charge transferred into the battery pack during successive fixed durations; and
   (b.) whenever the charge transferred into the battery pack during any one of said fixed durations exceeds a fixed maximum value, then cutting off current to the battery for the remainder of said one of said fixed durations; and
   (c.) at the beginning of the next one of said fixed durations, applying current to said battery if further charging is needed, and repeating said steps (a.) and (b.).

2. The method of claim 1, wherein said cutoff transistor is always turned off at least once during each of said fixed durations.

3. The method of claim 1, wherein said battery pack has a capacity of 100 Watt-hours or less.

4. The method of claim 1, wherein charge is transferred into said battery pack at a maximum rate in the range of 0.5 C to 2 C, and wherein the ratio of said fixed duration in seconds to the battery size in Watt-hours is more than 0.01.

5. The method of claim 1, wherein charge is transferred into said battery pack at a maximum C rate in the range of 0.5 C to 2 C, and wherein the ratio of said fixed duration in seconds to the battery size in Watt-hours is more than 0.1.

6. The method of claim 1, wherein charge is transferred into said battery pack at a maximum C rate which is higher than 1 C, and wherein the ratio of said fixed duration in seconds to the battery size in Watt-hours is more than 0.1 divided by said maximum C rate.

7. A method of charging a battery pack of 100 Watt-hours or less, comprising the steps of:
   (a.) connecting the battery pack to the available current from a power supply, while intermittently turning off a cutoff transistor as necessary to limit the average current into the battery pack;
   (b.) performing a further charging step which does not conform to said step (a.);
   wherein said step of turning off said cutoff transistor is performed no more than once per second.

8. The method of claim 7, wherein said cutoff transistor is always turned off at least once in every 30 seconds.

9. A method of charging a battery pack of 100 Watt-hours or less at a rate of 0.5 C or greater, comprising the steps of:
   (a.) connecting the battery pack to the available current from a power supply, while intermittently turning off a cutoff transistor as necessary to limit the average current into the battery pack;
   wherein said step of turning off said cutoff transistor is performed with a frequency which is greater than said charging rate.

10. The method of claim 9, wherein said cutoff transistor is always turned off at least once in every 30 seconds.

11. The method of claim 9, wherein said step (a.) is followed by a further charging step which does not conform to said step (a.).

12. A computer system comprising:
    at least one programmable processor;
    a battery connected to power said processor under at least some circumstances, and a battery charge subsystem which is configured
       to monitor charge transferred into a battery pack during each one of successive fixed durations,
       and to cut off current to said battery pack for the remainder of one of said fixed durations, whenever the charge transferred into said battery pack during said one of said fixed durations exceeds a fixed maximum value.

13. The system of claim 12, wherein current is always turned off for at least a fixed fraction of each of said fixed durations.

14. The system of claim 12, wherein said current is always turned off at least once during each of said fixed durations.

15. The system of claim 12, wherein said battery has a capacity of 100 Watt-hours or less.

16. The system of claim 12, wherein charge is transferred into said battery at a maximum rate in the range of 0.5 C to 2 C, and wherein the ratio of said fixed duration in seconds to the battery size in Watt-hours is more than 0.01.

17. The system of claim 12, wherein charge is transferred into said battery at a maximum C rate in the range of 0.5 C to 2 C, and wherein the ratio of said fixed duration in seconds to the battery size in Watt-hours is more than 0.1.

18. The system of claim 12, wherein charge is transferred into said battery at a maximum C rate which is higher than 1 C, and wherein the ratio of said fixed duration in seconds to the battery size in Watt-hours is more than 0.1 divided by said maximum C rate.

19. A computer system, comprising:
    a microprocessor;
    a memory system connected to be readable and writable by said microprocessor;
    monitor circuitry to monitor charge transferred into a battery pack during successive first fixed durations of time, said battery pack being connected to power said microprocessor;
    a cutoff transistor, connected to said monitor circuitry, and connected to cut off current to said battery pack for the remainder of one of said first fixed durations whenever the charge transferred into said battery pack during said one of said first fixed durations exceeds a fixed maximum value.

20. The system of claim 19, further comprising user input/output devices.

21. The system of claim 19, wherein current is always turned off for a second fixed duration during each of said first fixed durations.

22. The system of claim 19, wherein current is always turned off for at least a fixed fraction of each of said fixed durations.

23. The system of claim 19, wherein said current is always turned off at least once during each of said fixed durations.

24. The system of claim 19, wherein said battery pack has a capacity of 100 Watt-hours or less.

25. The system of claim 19, wherein charge is transferred into said battery at a maximum rate in the range of 0.5 C to 2 C, and wherein the ratio of said fixed duration in seconds to the battery size in Watt-hours is more than 0.01.

26. The system of claim 19, wherein charge is transferred into said battery at a maximum C rate in the range of 0.5 C to 2 C, and wherein the ratio of said fixed duration in seconds to the battery size in Watt-hours is more than 0.1.

27. The system of claim 19, wherein charge is transferred into said battery at a maximum C rate which is higher than 1 C, and wherein the ratio of said fixed duration in seconds to the battery size in Watt-hours is more than 0.1 divided by said maximum C rate.

28. A battery charging system, comprising:

a line which connects a battery pack to the available current from a power supply;

a cutoff transistor, connected to said line between said battery pack and said power supply and configured to limit the average current into the battery pack;

wherein said cutoff transistor is turned off no more than once per second;

wherein charge is transferred into said battery at a maximum rate in the range of 0.5 C to 2 C, and wherein the ratio of said fixed duration in seconds to the battery size in Watt-hours is more than 0.01.

29. The system of claim 28, wherein said cutoff transistor is always turned off at least once in every 30 seconds.

30. The system of claim 28, wherein charge is transferred into said battery at a maximum C rate in the range of 0.5 C to 2 C, and wherein the ratio of said fixed duration in seconds to the battery size in Watt-hours is more than 0.1.

31. The system of claim 28, wherein charge is transferred into said battery at a maximum C rate which is higher than 1 C, and wherein the ratio of said fixed duration in seconds to the battery size in Watt-hours is more than 0.1 divided by said maximum C rate.

* * * * *